United States Patent
Preising et al.

(10) Patent No.: US 8,881,585 B2
(45) Date of Patent: Nov. 11, 2014

(54) TEST BENCH FOR MOTOR VEHICLES

(71) Applicant: Dr. Ing. h.c. F. Porsche Aktiengesellschaft, Stuttgart (DE)

(72) Inventors: Eric Preising, Tiefenbronn (DE); Hans-Peter Loda, Neuhausen/Schellbronn (DE); Johannes Heine, Leonberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 29 days.

(21) Appl. No.: 13/721,133

(22) Filed: Dec. 20, 2012

(65) Prior Publication Data

US 2013/0160537 A1   Jun. 27, 2013

(30) Foreign Application Priority Data

Dec. 22, 2011  (DE) .......................... 10 2011 056 925
Feb. 28, 2012  (DE) .......................... 10 2012 101 613

(51) Int. Cl.
  *G01M 17/04*   (2006.01)
  *G01M 17/007*  (2006.01)

(52) U.S. Cl.
  CPC ............ *G01M 17/007* (2013.01); *G01M 17/04* (2013.01)
  USPC .................... 73/116.01; 73/115.07; 73/117.03

(58) Field of Classification Search
  USPC .............................. 73/115.07, 116.01, 117.03
  See application file for complete search history.

(56) References Cited

U.S. PATENT DOCUMENTS

| 4,263,809 | A | * | 4/1981 | Petersen et al. ................. 73/798 |
| 4,981,034 | A | * | 1/1991 | Haeg .......................... 73/118.01 |
| 5,072,611 | A | * | 12/1991 | Budd et al. ................. 73/115.07 |
| 5,083,453 | A | * | 1/1992 | Daley ......................... 73/118.01 |
| 5,465,615 | A | * | 11/1995 | Petersen et al. ............ 73/115.07 |
| 5,533,403 | A | * | 7/1996 | Haeg et al. ..................... 73/669 |
| 5,633,464 | A | * | 5/1997 | Haeg et al. ..................... 73/669 |
| 6,640,638 | B1 | * | 11/2003 | Haeg et al. ..................... 73/669 |
| 6,729,178 | B2 | * | 5/2004 | Leska et al. .................... 73/146 |
| 7,100,434 | B2 | * | 9/2006 | Gu et al. .......................... 73/146 |
| 7,146,859 | B2 | * | 12/2006 | Dittmann et al. ............... 73/669 |
| 7,254,995 | B2 | * | 8/2007 | Leska et al. .................... 73/146 |
| 7,921,713 | B2 | * | 4/2011 | Czoka et al. ............... 73/117.03 |
| 2006/0075810 | A1 | | 4/2006 | Gu et al. |

FOREIGN PATENT DOCUMENTS

| DE | 1233620 B | 2/1967 |
| DE | 4103097 A1 | 8/1991 |
| DE | 42 08 014 C2 | 2/1993 |
| DE | 4320107 A1 | 1/1994 |
| DE | 195 37 158 C2 | 4/1997 |
| DE | 10 2005 047 476 A1 | 5/2006 |

* cited by examiner

*Primary Examiner* — Freddie Kirkland, III
(74) *Attorney, Agent, or Firm* — Leydig, Voit & Mayer, Ltd.

(57) ABSTRACT

A test bench for motor vehicles and/or axles of motor vehicles for simulating gyroscopic torques of a rotating wheel includes a wheel replacement system connected to an axle of the motor vehicle. The wheel replacement system includes a wheel replacement mass and a driver for driving the wheel replacement mass. The test bench also includes an arrangement for applying testing forces, testing torques and testing movements in a longitudinal, lateral and/or vertical direction to the motor vehicle and/or axles of the motor vehicle. The driver is configured to set the wheel replacement mass in rotation. The arrangement for applying testing forces, testing torques and testing movements is configured to generate a gyroscopic torque of the wheel replacement mass which is set in rotation, by applying testing forces, testing torques and testing movements in the longitudinal, lateral and/or vertical direction to the motor vehicle and/or the axles of the motor vehicle.

8 Claims, 1 Drawing Sheet

TEST BENCH FOR MOTOR VEHICLES

CROSS REFERENCE TO RELATED APPLICATIONS

This application claims priority to German Patent Application Nos. 10 2011 056 925.1, filed on Dec. 22, 2011, and 10 2012 101 613.5, filed on Feb. 28, 2012, which are hereby incorporated by reference herein in their entirety.

FIELD

The present invention relates to a test bench for motor vehicles and/or axles of motor vehicles for simulating gyroscopic torques of a rotating wheel. Driving on roads by motor vehicles is simulated by means of such test benches, wherein, in particular, the effect of forces and torques which act on the chassis via wheels and wheel suspensions is checked. In order to simulate driving on roads in a way which is close to real conditions, testing forces and testing movements are applied to the wheel replacement body in all three spatial planes.

BACKGROUND

DE 195 37 158 C2 discloses a test bench for motor vehicles and/or for axles of motor vehicles, in which testing forces and testing movements are applied in the longitudinal, lateral and/or vertical direction to the motor vehicle and/or the axle by means of wheel replacement bodies, and in which braking forces can be generated by means of activation elements, and braking torques can therefore be simulated. Forces which are located virtually precisely in the plane of actual braking forces can be generated by the activation element in the form of a piston-cylinder arrangement when pressure medium is applied.

DE 42 08 014 C2 discloses a road simulation test bench for vehicle axles. The road simulation test bench respectively has, instead of wheels, a wheel replacement composed of a wheel disk and an outer ring which is rotatably connected to the wheel disk by means of a bearing, wherein longitudinal, vertical, lateral and braking forces are applied to the outer ring of the wheel replacement under the control of a process computer by means of different application points. A pushrod is attached to the application point of each of the forces, said pushrod being attached at its other end to a drive means for moving the pushrod in the longitudinal direction of the respective pushrod, and the braking force being applied as a torque via a cardan shaft which can be driven by a slewing motor and is connected to the wheel hub.

With the arrangements mentioned above, a torque can be applied to a wheel replacement body. However, with such arrangements it is not possible to investigate gyroscopic torques of a rotating wheel.

DE 10 2005 047 476 A1 discloses devices for simulating tire imbalance forces of the first order and of a higher order, wherein a wheel adapter, which is fastened to a vehicle wheel, rotates in a first rotational direction and is connected to a transmission. The device further has a weight holder which can be connected to the transmission, wherein the transmission rotates the weight holder in a second rotational direction or at a second rotational speed in first and second rotational directions, and a rotational restriction element is provided which can be fastened to the transmission in order to limit the rotation of the transmission. During the simulation of non-uniform tire forces or the measurement of a vibration of the tire, there is, however, a comparatively small force effect on the tire. However, when forces which exceed the grip limit of the tire act, the device mentioned above is not suitable for precisely simulating or evaluating the force effect.

SUMMARY

In an embodiment, the present invention provides a test bench for at least one of motor vehicles or axles of motor vehicles for simulating gyroscopic torques of a rotating wheel includes a wheel replacement system connected to an axle of the motor vehicle. The wheel replacement system includes a wheel replacement mass and a driver for driving the wheel replacement mass. The test bench also includes an arrangement for applying testing forces, testing torques and testing movements in at least one of a longitudinal, lateral or vertical direction to at least one of the motor vehicle or the axles of the motor vehicle. The driver for driving the wheel replacement mass is configured to set the wheel replacement mass in rotation. The arrangement for applying testing forces, testing torques and testing movements is configured to generate a gyroscopic torque of the wheel replacement mass which is set in rotation, by applying testing forces, testing torques and testing movements in at least one of the longitudinal, lateral or vertical direction to at least one of the motor vehicle or the axles of the motor vehicle.

BRIEF DESCRIPTION OF THE DRAWINGS

Exemplary embodiments of the present invention are described in more detail below with reference to the drawings, in which.

In the figures, identical reference symbols denote identical or functionally identical components.

DETAILED DESCRIPTION

Figure 1:
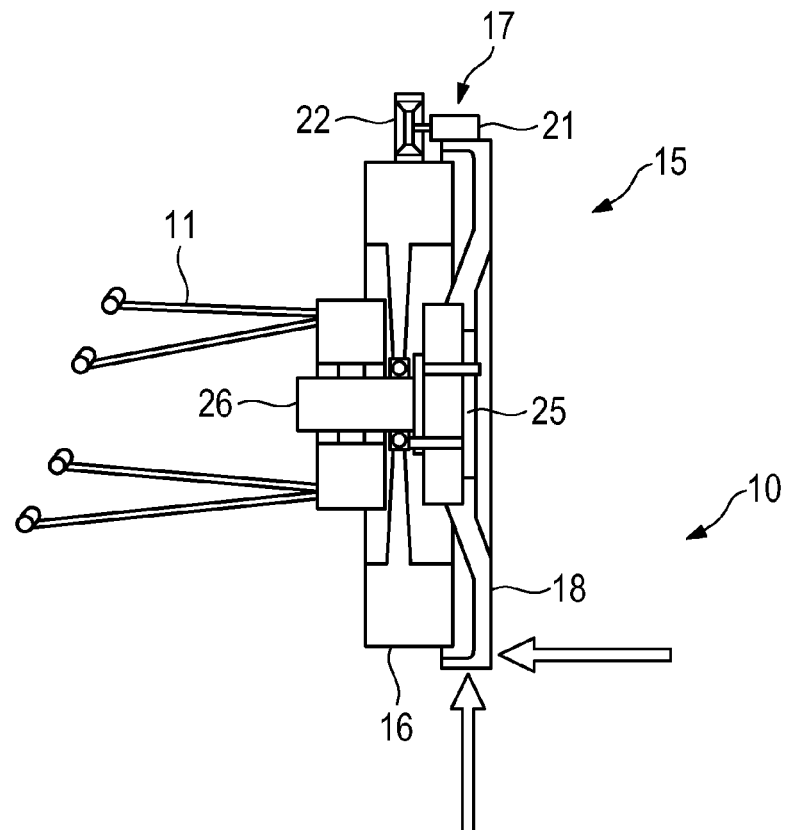
FIG. 1 shows a cross-sectional view of an exemplary embodiment of the wheel replacement system according to the invention.

In an embodiment, the present invention provides an improved test bench for motor vehicles and/or axles of motor vehicles for simulating gyroscopic torques of a rotating wheel, which test bench permits gyroscopic torques to be simulated under the action of spatial force components.

In an embodiment, the invention provides a test bench for motor vehicles and/or axles of motor vehicles for simulating gyroscopic torques of a rotating wheel. The test bench has a wheel replacement system which is connected to at least one axle of the motor vehicle and contains a wheel replacement mass and means for driving the wheel replacement mass. The test bench also has an arrangement for applying testing forces and testing movements in the longitudinal, lateral and/or vertical direction to the motor vehicle and/or the axles of the motor vehicle, wherein the means for driving the wheel replacement mass are suitable for setting the wheel replacement mass in rotation, and the arrangement for applying testing forces and testing movements is suitable for generating a gyroscopic torque of the wheel replacement mass which is set in rotation, by applying testing forces and testing movements in the longitudinal, lateral and/or vertical direction to the motor vehicle and/or the axles of the motor vehicle.

By applying the testing forces and testing movements it is therefore possible to generate a desired gyroscopic torque and to investigate its action on the axle of the motor vehicle. By providing the wheel replacement system with a wheel replacement mass, by providing means for driving the wheel replacement mass and by providing the arrangement for applying testing forces and testing movements, which is connected to the wheel replacement system, it is therefore possible to implement testing forces and testing movements precisely. In contrast to an arrangement using a wheel/tire combination it is possible, with the arrangement according to the invention, to generate and detect gyroscopic torques more precisely since a vehicle tire has elastic deformation and a defined grip limit which does not permit precise application of forces and therefore precise generation of gyroscopic torques. In addition, the provision of the wheel replacement mass saves space compared to a convention vehicle wheel, with the result that the test bench and/or the wheel replacement system provided in the test bench have/has a more compact design.

The wheel replacement mass is preferably rotatably mounted and can be brought to a defined rotational speed by the means for driving the wheel replacement mass. A driving state of the vehicle as well as deflections of the axle in the longitudinal, lateral and/or vertical direction in a driving state of the vehicle can therefore be detected by means of the drive torque of the wheel replacement mass. The arrangement for applying testing forces and testing movements can be excited, for example, by means of synthetic signals or road profiles. As a result, the gyroscopic torque which occurs during a spatial displacement of the wheel replacement mass which is set in rotation can be simulated, and measured by means of corresponding measuring devices.

According to one advantageous development of the invention there is provision that the wheel replacement mass can be operated at different rotational speeds. By virtue of the use of the wheel replacement mass which has smaller dimensions in terms of volume compared to a vehicle wheel and has means for driving the wheel replacement mass, the variable gyroscopic torques which occur during rotation of the wheel replacement mass can be measured more precisely. Dynamic deflection of a rotating system gives rise to gyroscopic forces and gyroscopic torques which give rise to a change in the position of the wheel.

There is advantageously provision that the arrangement for applying testing forces and testing movements is suitable for applying testing forces and testing movements to the motor vehicle and/or the axles of the motor vehicle by means of a mount which is connected to at least one axle of the motor vehicle. When testing forces and testing movements are applied, there is therefore a direct connection between the arrangement for applying testing forces and testing movements and the motor vehicle or the axle of the motor vehicle by means of the mount. On the basis of the rotatable mounting of the wheel replacement mass in the wheel replacement system, the applied movement is therefore tracked by the wheel replacement mass without the of elastic deformation of the wheel replacement mass.

According to one advantageous development of the invention there is provision that the means for driving the wheel replacement mass are attached to the mount and have an electric motor and a drive wheel which is connected to the electric motor, wherein the drive wheel has a running face which is formed from a synthetic material. As a result of the drive wheel being fastened to the mount, wherein the drive wheel makes contact with the wheel replacement mass which is rotatably mounted in the wheel replacement system, effective transmission of force from the drive wheel to the wheel replacement mass is therefore possible. The drive wheel therefore cannot slip relative to the wheel replacement mass when, for example, testing forces and testing movements are applied in the lateral direction.

There is preferably provision that the drive wheel makes contact with a circumferential face of the wheel replacement mass. As a result, for example a rotating vehicle wheel can be simulated.

According to a further preferred exemplary embodiment there is provision that the means for driving the wheel replacement mass are connected to a wheel hub of the at least one axle of the motor vehicle. This makes it possible to make available a drive of the wheel replacement system by means of a drive shaft of the vehicle. The means for driving the wheel replacement mass can therefore be connected both to the vehicle-side part of the wheel hub and to an end side of the wheel hub.

There is preferably provision that the wheel replacement mass is fastened to the wheel hub of the at least one axle of the motor vehicle. As a result, it is possible to fasten the wheel replacement mass to the vehicle-side part of the wheel hub or to an end-side part of the wheel hub. This permits a multiplicity of configurations of the wheel replacement system corresponding to structural specifications.

According to one advantageous development of the invention there is provision that the wheel replacement mass can be controlled by means of the arrangement for applying testing forces and testing movements or by means of a steering gear of the vehicle. The gyroscopic torque which occurs during a steering movement of the wheel mass which is set in rotation can therefore be generated by deflecting the wheel replacement mass by means of the vehicle-side steering gear or the arrangement for applying testing forces and testing movements.

There is advantageously provision that the arrangement for applying testing forces and testing movements is embodied by a piston and cylinder arrangement, wherein different application points of the longitudinal, vertical and lateral forces are arranged on the mount of the wheel replacement system. As a result, the wheel replacement system can be excited in up to six degrees of freedom, and this can be implemented, for example, even with a hexapod system.

A test bench 10 for motor vehicles or axles of motor vehicles for chassis development with a facility for simulating gyroscopic torques of rotating wheels according to FIG. 1 has at least an axle 11 of a motor vehicle, a wheel replacement system 15 which is connected to the axle 11 of the motor vehicle, and an arrangement for applying testing forces and testing movements. The axle 11 of the motor vehicle is merely represented by a multiplicity of transverse links for the purpose of illustration. The wheel replacement system 15 has a wheel replacement mass 16, means 17 for driving the wheel replacement mass 16 and a mount 18. According to the exemplary embodiment, the wheel replacement mass 16 is rotatably mounted on a wheel bearing 26 of the axle 11 of the motor vehicle. The bearing is embodied by a roller bearing and is fastened to a wheel hub 25 which is adjacent to the wheel bearing 26. The means 17 for driving the wheel replacement mass 16 have an electric motor 21 and a drive wheel 22 which is connected to the electric motor 21. The electric motor 21 is fastened to the mount 18, wherein the drive wheel 22 is connected to the electric motor 21 by means of a drive shaft. The drive wheel 22 has a running face which is formed from a synthetic material. Alternatively, the drive wheel 22 can also be embodied from another suitable material. The drive wheel 22 is arranged in such a way that it makes contact with a circumferential face of the wheel replacement mass 16.

The mount 18 is embodied in two parts and is fastened to the end-side part of the wheel hub 25. The mount 18 has an upper section and a lower section. The upper section of the mount 18 is fastened in an upper region of the wheel hub 25 and extends vertically beyond an upper edge of the wheel replacement mass 16. The upper section of the mount 18 extends, in particular, from an upper region of the wheel hub 25 in the axial direction of the wheel bearing 26, and upward in the vertical direction according to a first section of the upper section of the mount 18. A second section of the upper section of the mount 18, which adjoins the first section of the upper section of the mount 18, extends upward in the vertical direction beyond an upper edge of the wheel replacement mass 16. A third section of the upper section of the mount 18, which adjoins the second section of the upper section of the mount 18, extends in the axial direction of the wheel bearing 26 in the direction of the wheel replacement mass 16.

The lower section of the mount 18 has a first section which is fastened in a lower region of the wheel hub 25. The first section of the lower section of the mount 18 extends in the axial direction of the wheel bearing 26 and downward in the vertical direction. A second section of the lower section of the mount 18, which adjoins the first section of the lower section of the mount 18, extends vertically downward beyond a lower edge of the wheel replacement mass 16. A third section of the lower section of the mount 18, which adjoins the second section of the lower section of the mount 18, extends in the axial direction of the wheel bearing 26, in the direction of the wheel replacement mass 16.

The arrangement for applying testing forces and testing movements is not illustrated according to FIG. 1. The application of testing forces and testing movements in the longitudinal, lateral and/or vertical direction to the motor vehicle and/or the axles of the motor vehicle is represented by way of example by a horizontal arrow and a vertical arrow at the lower section of the mount. The arrangement for applying testing forces and testing movements is embodied in such a way that said arrangement has different application points of the longitudinal, vertical and lateral forces on the mount 18 of the wheel replacement system 15. The vertically arranged arrow illustrates a vertical force which is applied by the arrangement for applying testing forces and testing movements, and the horizontally arranged arrow illustrates a lateral force which is applied by the arrangement for applying testing forces and testing movements.

The axis 11 of the motor vehicle is mounted on the wheel bearing 26 by means of suitable bearings. The means 17 for driving the wheel replacement mass 16 are suitable for setting the wheel replacement mass 16 in rotation, wherein the wheel replacement mass 16 can be operated at a rotational speed of up to 1000 rpm or more. A driving torque is therefore generated by setting the wheel mass 16 in rotation. The wheel replacement mass 16 is arranged in a freely rotating fashion and has merely one connection to the bearing and to the means 17 for driving the wheel replacement mass 16. If a testing force or testing movement is applied to the motor vehicle or the axles of the motor vehicle by the arrangement for applying testing forces and testing movements while the wheel replacement mass 16 is set in rotation, a gyroscopic torque is generated which is detected by measuring devices (not shown) for detecting changes in the positions of wheels.

Corresponding measuring devices can be embodied, for example, in the form of a measuring hub or an optical measuring system.

Figure 2:
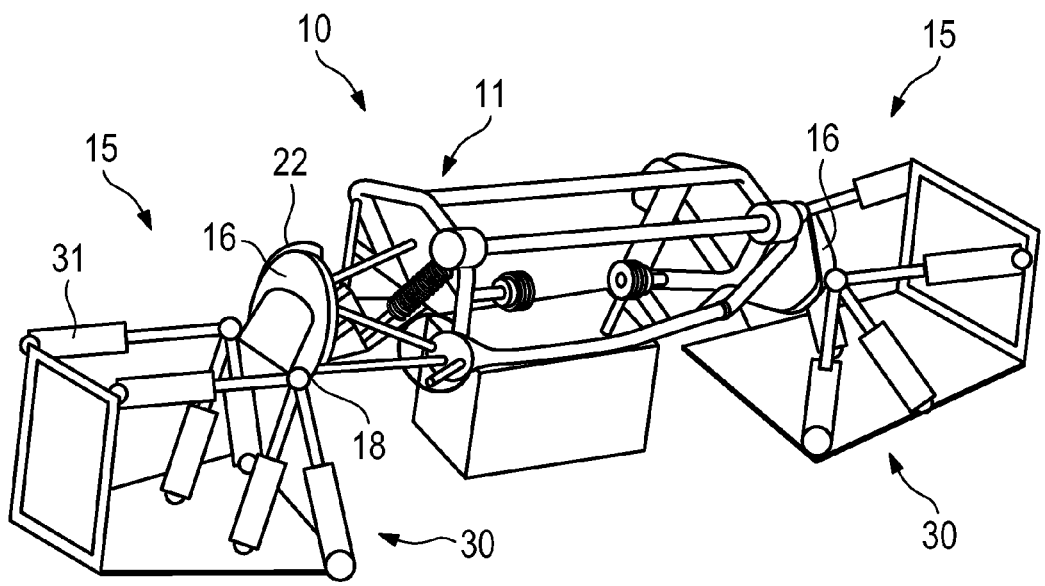
FIG. 2 shows a perspective view of a vehicle axle having the wheel replacement system according to the invention, on a schematically illustrated test bench.

FIG. 2 shows a perspective view of the test bench 10 for motor vehicles and/or axles of motor vehicles for simulating gyroscopic torques of a rotating wheel. According to the illustration, the axle 11 of the motor vehicle and the wheel replacement system 15 are respectively illustrated on the left-hand side and right-hand side of the axle 11 of the motor vehicle. The arrangement for applying testing forces and testing movements is embodied by a piston and cylinder arrangement 30, wherein different application points of the longitudinal, vertical and lateral forces are arranged on the mount 18 of the wheel replacement system 15. According to the exemplary embodiment, the changes in wheel position are detected by an optical measuring device 31. Alternatively the means for detecting the changes in wheel position can also be in the form of a mechanical measuring arm.

The test bench 10 for motor vehicles and/or axles of motor vehicles for simulating gyroscopic torques of a rotating wheel is configured for an excitation frequency of more than 30 Hz. In this context, complete axles can be tested or the entire vehicle can be tested. The wheel replacement system 15 is excited by synthetic signals or, for example, predefinable road profiles. The test bench 10 therefore permits dynamic acquisition of characteristic values, in particular of gyroscopic torques of the wheel replacement system 15, in the form of an oscillation analysis of individual axles or on the whole chassis. Furthermore, measurement of dynamic elastokinematics is made possible by taking into account deformation of rubber-metal bearings, ball-and-socket joints and other components of the axle 11 of the motor vehicle. In this context, deflection of the piston and cylinder arrangement 30 is compared with a spatial deflection of the wheel replacement system 15 and of the axle 11, connected to the wheel replacement system 15, of the motor vehicle, wherein differences which occur are due to the elastokinematics. The test bench 10 also permits real chassis characteristic values to be determined for the CAE field, as well as allowing a subjective vehicle movement dynamics adaptation to be analyzed and localization and analytic elimination of problems involving acoustic anomalies which arise during driving trials.

While the invention has been particularly shown and described with reference to preferred embodiments thereof, it will be understood by those skilled in the art that various changes in form and details may be made therein without departing from the spirit and scope of the invention.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

What is claimed is:

1. A test bench for at least one of motor vehicles or axles of motor vehicles for simulating gyroscopic torques of a rotating wheel, the test bench comprising a wheel replacement system connected to an axle of the motor vehicle and including a wheel replacement mass and a driver for driving the wheel replacement mass, the driver beings attached to a mount and including an electric motor and a drive wheel connected to the electric motor, the drive wheel making contact with a circumferential face of the wheel replacement mass and including a running face formed of a synthetic material, and an arrangement for applying testing forces, testing torques and testing movements in at least one of a longitudinal, lateral or vertical direction to at least one of the motor vehicle or the axles of the motor vehicle, wherein:

the driver for driving the wheel replacement mass is configured to set the wheel replacement mass in rotation, and the arrangement for applying testing forces, testing torques and testing movements is configured to generate a gyroscopic torque of the wheel replacement mass which is set in rotation, by applying testing forces, testing torques and testing movements in at least one of the longitudinal, lateral or vertical direction to at least one of the motor vehicle or the axles of the motor vehicle.

2. The test bench as recited in claim 1, wherein the wheel replacement mass is rotatably mounted and configured to be brought to a defined rotational speed by the driver for driving the wheel replacement mass.

3. The test bench as recited in claim 1, wherein the wheel replacement mass is operable at different rotational speeds.

4. The test bench as recited in claim 1, wherein the arrangement for applying testing forces and testing movements is suitable for applying testing forces and testing movements to at least one of the motor vehicle or the axles of the motor vehicle by means of a mown which is connected to at least one axle of the motor vehicle.

5. The test bench as recited in claim 1, wherein the driver for driving the wheel replacement mass are connected to a wheel hub of the at least one axle of the motor vehicle.

6. The test bench as recited in claim 1, wherein the wheel replacement mass is fastened to the wheel hub of the at least one axle of the motor vehicle.

7. The test bench as recited in claim 1, wherein the wheel replacement mass can be controlled by means of the arrangement for applying testing forces and testing movements or by means of a steering gear of the vehicle.

8. The test bench as recited in claim 1, wherein the arrangement fir applying testing forces and testing movements is embodied by a piston and cylinder arrangement, wherein different application points of the longitudinal, vertical and lateral forces are arranged on the mount of the wheel replacement system.

* * * * *